(12) United States Patent
Pacella et al.

(10) Patent No.: US 8,898,805 B2
(45) Date of Patent: Nov. 25, 2014

(54) ELECTRONIC IDENTIFICATION

(75) Inventors: Dante Pacella, Charles Town, WV (US); Harold J. Schiller, Silver Spring, MD (US); Mark D. Carney, Sterling, VA (US); Eric R. Sorensen, Boyce, VA (US); Heather Schiller, Silver Spring, MD (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 585 days.

(21) Appl. No.: 12/902,173

(22) Filed: Oct. 12, 2010

(65) Prior Publication Data

US 2012/0090038 A1 Apr. 12, 2012

(51) Int. Cl.
*H04L 29/06* (2006.01)
*G06Q 20/32* (2012.01)
*G06Q 20/40* (2012.01)
*H04W 12/06* (2009.01)

(52) U.S. Cl.
CPC .......... *H04W 12/06* (2013.01); *G06Q 20/3224* (2013.01); *G06Q 20/4014* (2013.01); *G06Q 20/40145* (2013.01); *G06Q 20/32* (2013.01)
USPC ............................................ 726/30; 713/193

(58) Field of Classification Search
USPC ........................................................ 726/30
See application file for complete search history.

(56) References Cited

U.S. PATENT DOCUMENTS

| | | | |
|---|---|---|---|
| 7,207,480 B1* | 4/2007 | Geddes | 235/380 |
| 7,314,167 B1* | 1/2008 | Kiliccote | 235/380 |
| 8,155,392 B1* | 4/2012 | McWilliams et al. | 382/115 |
| 8,285,329 B1* | 10/2012 | Zhu | 455/558 |
| 2004/0010472 A1* | 1/2004 | Hilby et al. | 705/67 |
| 2006/0265243 A1* | 11/2006 | Racho et al. | 705/1 |
| 2007/0194123 A1* | 8/2007 | Frantz et al. | 235/462.45 |
| 2008/0102766 A1* | 5/2008 | Schultz | 455/110 |
| 2009/0132392 A1* | 5/2009 | Davis et al. | 705/28 |
| 2009/0254440 A1* | 10/2009 | Pharris | 705/17 |
| 2011/0088090 A1* | 4/2011 | O'Brien et al. | 726/19 |
| 2011/0238517 A1* | 9/2011 | Ramalingam et al. | 705/26.1 |

\* cited by examiner

*Primary Examiner* — Vu Le
*Assistant Examiner* — Tracy Mangialaschi

(57) ABSTRACT

A method may include forwarding, by a mobile device, a request for identification information associated with a user of the mobile device. The method may also include receiving, from an identification provider, the identification information, and displaying, by the mobile device, at least some of the identification information.

22 Claims, 8 Drawing Sheets

| | ID PRESENTER 702 | CHILDREN 704 | RESTRICTIONS 706 |
|---|---|---|---|
| 440-1 | BILL SMITH | JANE SMITH | NONE |
| 440-2 | MARY SMITH | JANE SMITH | NONE |
| 440-3 | ROGER JONES | CARL JONES BETH JONES | CUSTODY ON SATURDAY, SUNDAY |
| 440-4 | SUSAN JONES | CARL JONES BETH JONES | CUSTODY ON MONDAY-FRIDAY |
| ... | ... | ... | ... |
| 440-N | JOE ROGERS | MIKE ROGERS | NONE |

FIG. 7

ELECTRONIC IDENTIFICATION

BACKGROUND INFORMATION

Various forms of identification (ID) are used by people during daily events. For example, age verification is often required for purchasing alcohol or tobacco products. As another example, many workplaces require a photo ID in order to enter a building/office. As a result, people often must carry many forms of identification in a wallet, purse, etc. If a person loses his/her wallet or purse, it is often very time consuming for the user to replace all of his/her forms of identification.

BRIEF DESCRIPTION OF THE DRAWINGS

FIG. 7 illustrates an exemplary database used in conjunction with the processing of FIG. 6.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to providing electronic identification. In an exemplary implementation, a mobile device may be used to facilitate a secure method to retrieve an individual's identification and/or other information associated with the individual. For example, the mobile device may communicate with an identification provider to retrieve and display an electronic ID, without requiring a physical copy of the ID. In some implementations, an electronic or virtual ID may be retrieved along with other information to streamline a verification process regarding an individual's identity, as well as provide the ability to correlate information associated with an individual across multiple systems without compromising the privacy of the individual whose information may be stored.

Figure 1:
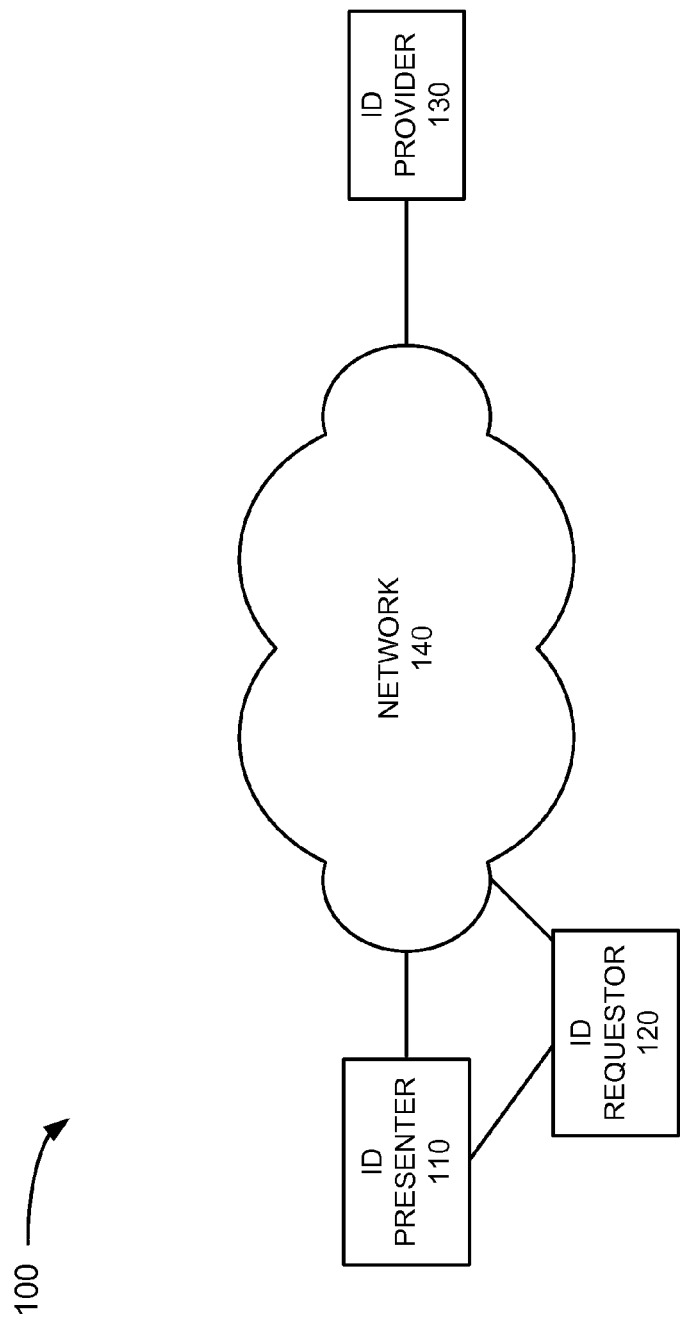
FIG. 1 illustrates an exemplary network in which systems and methods described herein may be implemented.

FIG. 1 is a block diagram of an exemplary network 100 in which systems and methods described herein may be implemented. Network 100 may include identification (ID) presenter 110, ID requestor 120, ID provider 130 and network 140.

In an exemplary implementation, ID presenter 110 may represent a device associated with a party whose ID is being managed by ID provider 130. For example, the party whose ID is being managed may be a person who has a driver's license that is electronically stored and managed by ID provider 130. ID presenter 110 may include a mobile device, such as wireless or cellular telephone device (e.g., a conventional cell phone with data processing capabilities), a smart phone, a personal digital assistant (PDA) that can include a radiotelephone, etc. In another implementation, ID presenter 110 may include any type of mobile computer device or system, such as a personal computer (PC), a laptop, a tablet computer, a notebook, a netbook, etc., that may include communication functionality. ID presenter 110 may connect to network 140 and other devices in network 100 (e.g., ID requestor 120) via any conventional technique, such as wired, wireless, or optical connections. The term ID presenter 110 and the person associated with ID presenter 110 (e.g., the party holding or using ID presenter 110) may be referred to collectively as ID presenter 110 in the description below.

ID requestor 120 may represent a point of transaction where the ID of a party associated with ID presenter 110 needs to be verified. For example, ID requestor 120 may be a liquor store where ID must be presented to show proof of age, a border crossing between countries where some proof of identity must be presented to allow entry into the country, a workplace where a company ID must be presented to allow entry into a building, etc.

ID provider 130 may represent an entity responsible for creating, distributing and/or managing IDs for individuals. For example, ID provider 130 may include a Department of Motor Vehicles, a Department of Health and Human Services, etc., that issue IDs for large numbers of people. In each case, ID provider 130 may facilitate verification of the ID of ID presenter 110, as described in detail below.

Network 140 may include one or more wired, wireless and/or optical networks that are capable of receiving and transmitting data, voice and/or video signals. For example, network 140 may include one or more public switched telephone networks (PSTNs) or other type of switched network. Network 140 may also include one or more wireless networks and may include a number of transmission towers for receiving wireless signals and forwarding the wireless signals toward the intended destination. Network 140 may further include one or more satellite networks, one or more packet switched networks, such as an Internet protocol (IP) based network, a local area network (LAN), a wide area network (WAN), a personal area network (PAN), a WiFi network, an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, network 100, may include thousands of ID presenters 110, ID requestors 120 and ID providers 130 similar to ID presenter 110, ID requestor 120 and ID provider 130. In addition, network 140 may include additional elements, such as switches, gateways, routers, etc., that aid in routing data.

Further, various functions are described below as being performed by particular components in network 100. In other implementations, various functions described as being performed by one device may be performed by another device or multiple other devices, and/or various functions described as being performed by multiple devices may be combined and performed by a single device.

Figure 2:
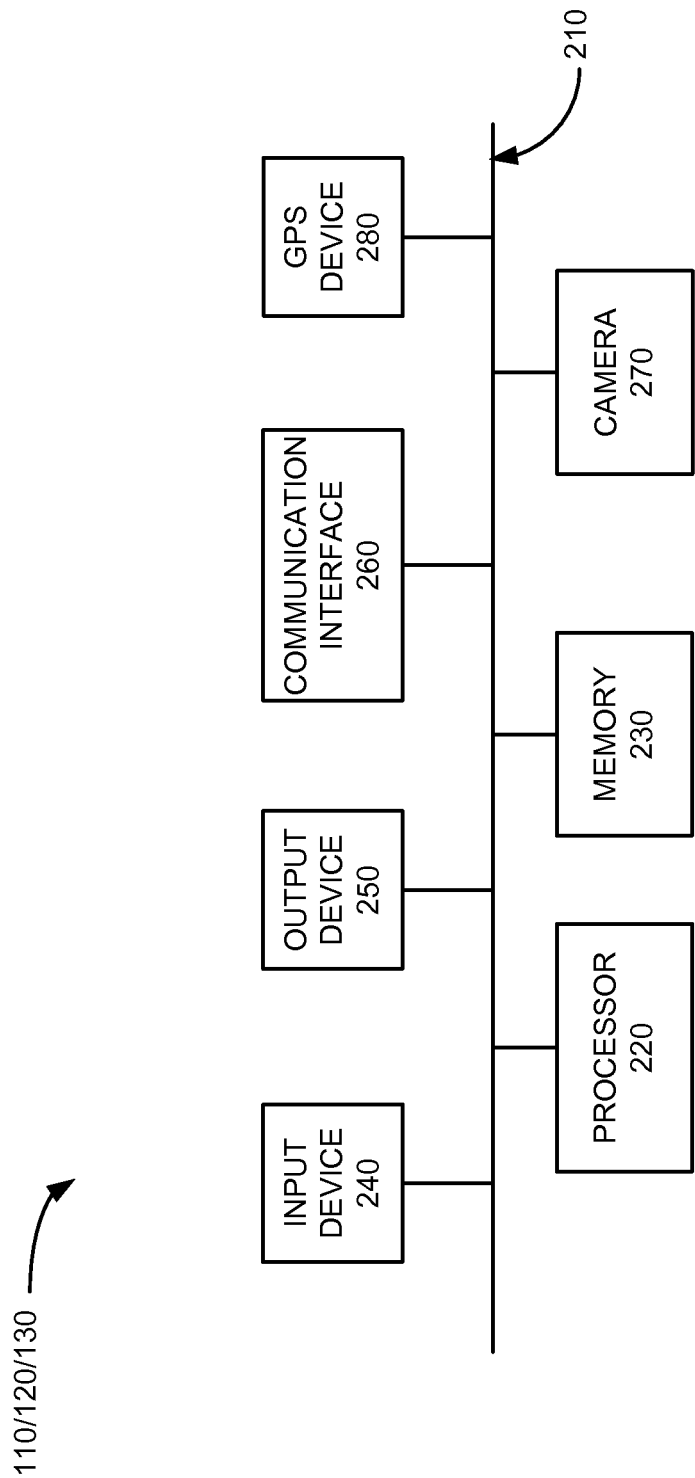
FIG. 2 illustrates an exemplary configuration of components implemented in one or more of the devices of FIG. 1.

FIG. 2 illustrates an exemplary configuration of ID presenter 110. Other devices in network 100, such as ID requestor 120 and ID provider 130 may be configured in a similar manner. Referring to FIG. 2, ID presenter 110 may include bus 210, processor 220, memory 230, input device 240, output device 250, communication interface 260, camera 270 and global positioning system (GPS) device 280. Bus 210 may include a path that permits communication among the elements of ID presenter 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to ID presenter 110, such as a keyboard, a keypad, a mouse, a pen, a microphone, a touch screen, voice recognition and/or biometric mechanisms, etc. Output device 250 may include a mechanism that outputs information to the user, including a display, a printer, a speaker, etc.

Communication interface 260 may include a transceiver that ID presenter 110 (or ID requestor 120, ID provider 130) may use to communicate with other devices via wired, wireless or optical mechanisms. Communication interface 260 may also include one or more radio frequency (RF) transmitters, receivers and/or transceivers and one or more antennas for transmitting and receiving RF data via network 140. Communication interface 260 may also include a modem or an Ethernet interface to a LAN or other mechanisms for communicating with elements in a network, such as network 140 or another network.

Camera 270 may include components that allow ID presenter 110 to capture still and/or moving images. Camera 270 may include a lens and shutter as well as other conventional camera elements used to capture images.

GPS device 280 may include components that allow ID presenter 110 to determine its location, such as its geographical coordinates. In an exemplary implementation, GPS device 280 may include a GPS receiver that receives information from GPS satellites that allows GPS device 280 to calculate its location (e.g., latitude and longitude).

The exemplary configuration illustrated in FIG. 2 is provided for simplicity. It should be understood that ID presenter 110, ID requestor 120 and ID provider 130 may include more or fewer devices than illustrated in FIG. 2. In an exemplary implementation, ID presenter 110 (or ID requestor 120, ID provider 130) may perform operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
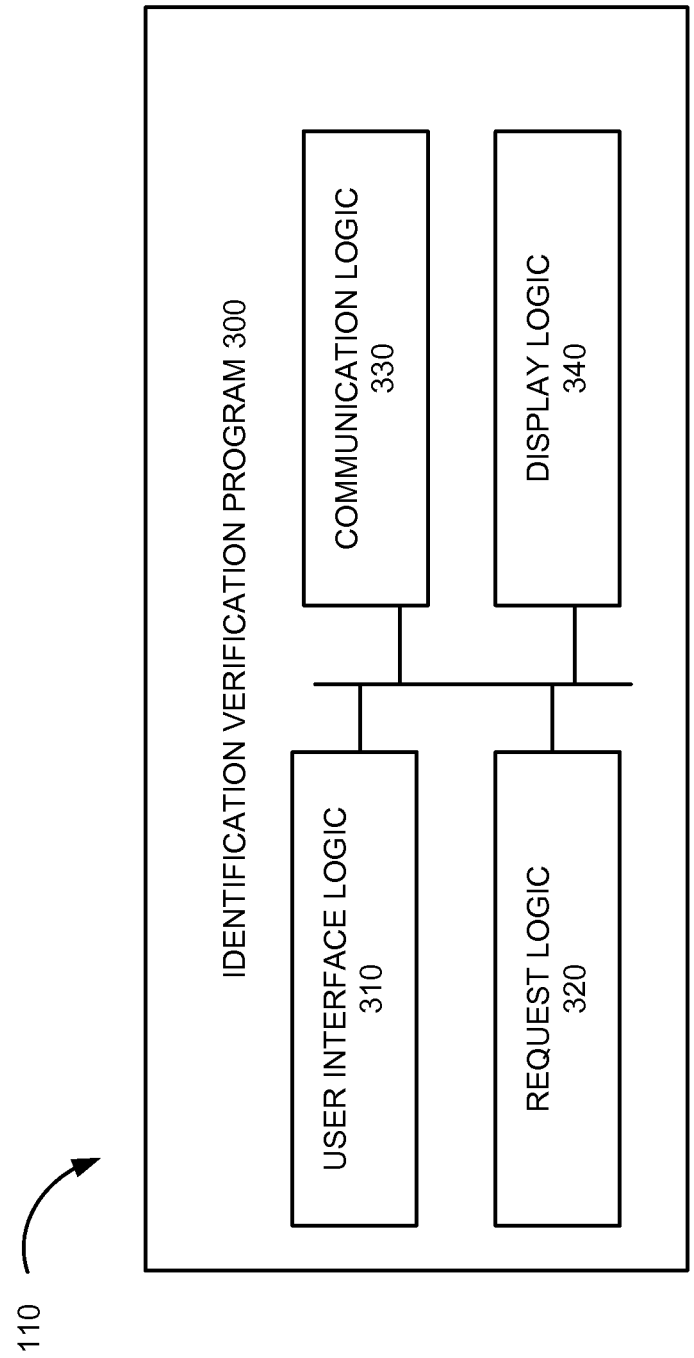
FIG. 3 illustrates an exemplary configuration of logic components implemented by one of the devices of FIG. 1.

FIG. 3 is an exemplary functional block diagram of components implemented in ID presenter 110 of FIG. 2. In an exemplary implementation, all or some of the components illustrated in FIG. 3 may be stored in memory 230. For example, referring to FIG. 3, memory 230 may include identification (ID) verification program 300. ID verification program 300 may include software instructions executed by processor 220 that allows a party associated with ID presenter 110 to have his/her ID verified by another party, such as a party associated with ID requestor 120.

ID verification program 300 may include user interface logic 310, request logic 320, communication logic 330 and display logic 340. ID verification program 300 and its various logic components are shown in FIG. 3 as being included in ID presenter 110. In alternative implementations, these components or a portion of these components may be located externally with respect to ID presenter 110. For example, in some implementations, one or more of the components of ID verification program 300 may be located in or executed by ID requestor 120 or located in another device external to ID presenter 110.

User interface logic 310 may include logic to provide a user with an interface to enter information associated with requesting ID verification. For example, user interface logic 310 may include a graphical user interface (GUI) that allows a user to easily enter information to request his/her ID from ID provider 130.

Request logic 320 may include logic associated with generating request messages for requesting information from ID provider 130, such as ID verification information. For example, request logic 320 may forward a request for an ID on behalf of a party associated with ID presenter 110.

Communication logic 330 may include logic for communicating with other devices in network 100. For example, communication logic 330 may receive information associated with the requested ID provided by request logic 320 and forwarding the request to ID provider 130 via network 140. Communication logic 330 may also receive information from ID provider 130. In some implementations, communication logic 330 may also forward information to and receive information from ID requestor 120.

Display logic 340 may include logic to display information received from, for example, ID provider 130. In one exemplary implementation, display logic 340 may output information to output device 250, such as a liquid crystal display (LCD) screen or another type of display screen. For example, in one implementation, display logic 340 may display a photo ID and other information received from ID provider 130.

Figure 4:
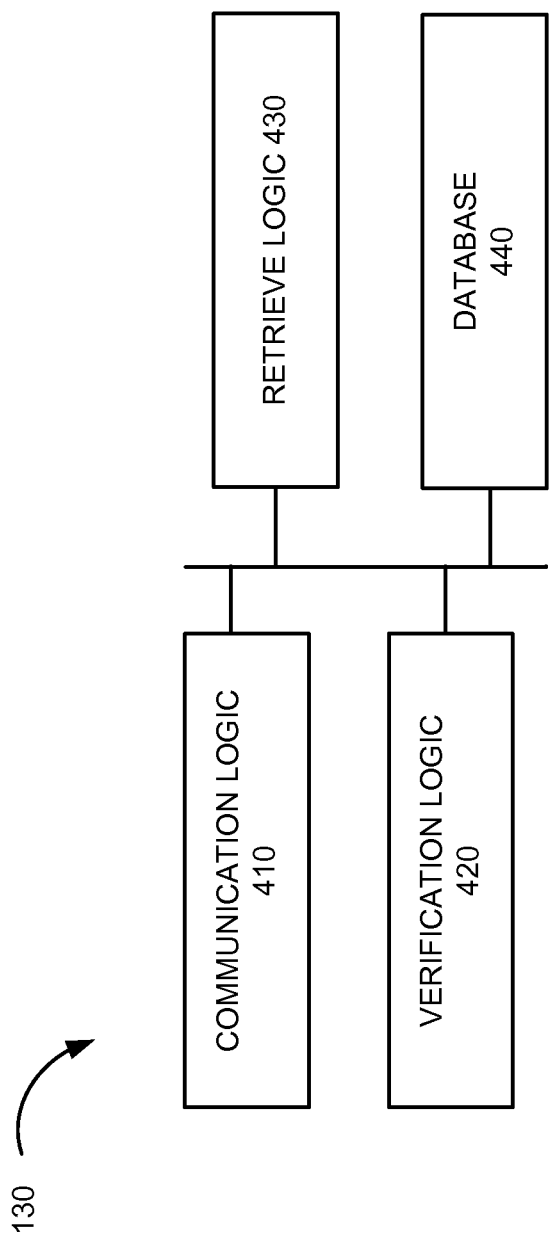
FIG. 4 illustrates an exemplary configuration of logic components implemented by another one of the devices of FIG. 1.

FIG. 4 illustrates an exemplary configuration of logic components implemented in ID provider 130. Referring to FIG. 4, ID provider 130 may include communication logic 410, verification logic 420, retrieve logic 430 and database 440. It should be understood that ID provider 130 may include more or fewer logic devices than illustrated in FIG. 4.

Communication logic 410 may include logic that allows ID provider 130 to communicate with other devices in network 100 via network 140. For example, communication logic 410 may allow ID provider 130 to communicate with ID presenter 110 and ID requestor 120 via network 140.

Verification logic 420 may include logic for processing ID verification requests from various parties, such as a party associated with ID presenter 110. Retrieve logic 430 may include logic associated with accessing databases, such as database 440 or databases located externally with respect to ID provider 130, to verify a user's identity and/or provide additional information regarding the party requesting ID information.

Database 440 may include one or more databases or information associated with a user's identity. For example, database 440 may include a database of driver's licenses for a large number of parties, a database of birth certificates, a database of work-related credentials, etc.

In an exemplary implementation, communication logic 410, verification logic 420, retrieve logic 430 and database 440 may include one or more processors, microprocessors or other processing logic, such as processor 220 (FIG. 2) used to interpret and execute instructions. In such implementations, the logic components may include software instructions stored in a computer-readable medium, such as memory 230. A computer-readable medium may be defined as one or more memory devices. The software instructions may be read into memory from another computer-readable medium or from another device via a communication interface. The software instructions contained in memory may cause the various logic components to perform processes that are described below. Alternatively, hardwired circuitry may be used in place of or in combination with software instructions to implement the logic processes consistent with the exemplary embodiments. Thus, systems and methods described herein are not limited to any specific combinations of hardware circuitry, firmware, and software.

Figure 5:
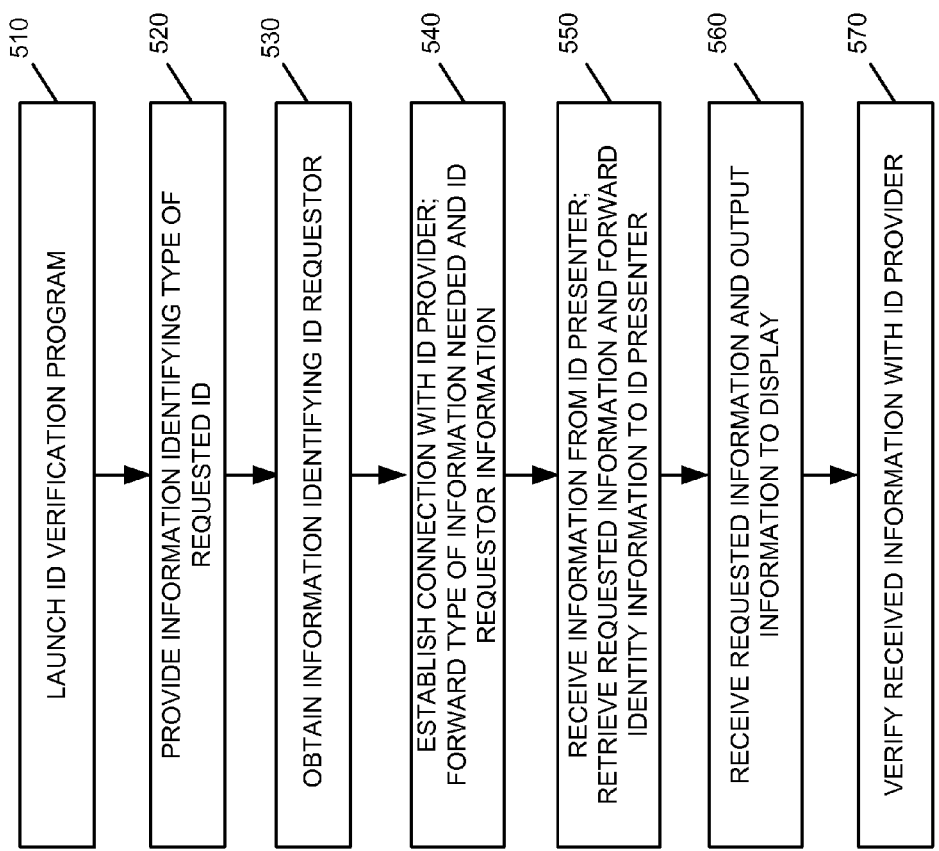
FIG. 5 is a flow diagram illustrating exemplary processing by various components illustrated in FIG. 1 in accordance with an exemplary implementation.

FIG. 5 is a flow diagram illustrating exemplary processing associated with performing ID verification in network 100. In this example, assume that a party associated with ID presenter 110 would like to purchase alcohol at a liquor store. Further assume that ID requestor 120 represents the liquor store and that ID provider 130 represents a state's Department of Motor Vehicles (DMV) that stores and manages drivers' license information. Processing may begin with the party associated with ID presenter 110 (referred to herein as the user) opening or launching ID verification program 300 (act 510). For example, assume that ID presenter 110 is a mobile device, such as a cell phone, that stores ID verification program 300. The user may access a menu or user interface on the cell phone and open/launch ID verification program 300. After launching ID verification program 300, the user may interact with user interface logic 310 to provide information identifying what type of ID verification is needed (act 520).

For example, user interface logic 310 may include a GUI that requests whether the user would like to obtain age verification information from the DMV, birth certificate information from a governmental department, citizenship information from a governmental agency, etc. The user may interact with the GUI to enter information identifying the type of requested information. In this example, assume that the user has entered information indicating that he/she would like to obtain age verification information from the DMV.

ID presenter 110 may also obtain information identifying ID requestor 120 (act 530). For example, the identity and/or location of ID requestor 120 may be determined in a number of ways. As one example, the location/identity of a brick and mortar store (i.e., the liquor store in this example) could be determined by the location of ID presenter 110. That is, GPS device 280 in ID presenter 110 may identify the geographical location of ID presenter 110. When the user of ID presenter 110 is located inside the liquor store, the GPS coordinates of ID presenter 110 will identify the location of the liquor store or a location proximate to the liquor store. As another example, ID requestor 120 may include a barcode located on the counter of the liquor store. ID presenter 110 may scan the barcode via a scanning device included in ID presenter 110 or take a picture of the barcode via camera 270 included in ID presenter 110. This barcode may uniquely identify ID requestor 120. In still other implementations, the user of ID presenter 110 may enter a unique code (e.g., the liquor store's public key information or some other code) into ID presenter 110 via input device 240 (e.g., a keypad). In each case, ID presenter 110 may obtain information regarding the type of requested information (i.e., age verification/driver's license in this example) and information identifying ID requestor 120. This information may be used by ID provider 130 to provide the requested information, as described in detail below.

ID presenter 110 may then establish a connection with ID provider 130 (act 540). For example, communication logic 330 may send a message to ID provider 130 via network 140 to establish a secure communication link between ID presenter 110 and ID provider 130. Communication logic 410 may receive the message and establish the secure link with ID presenter 110.

Communication logic 330 of ID presenter 110 may also forward the requested information obtained by ID presenter 110 to ID provider 130. For example, communication logic 330 may forward information identifying the requested information (e.g., ID and proof of age for the user). The request may also include a unique code associated with the user and/or ID verification program 300 stored in ID presenter 110. For example, ID verification program 300 stored on ID presenter 110 may include a unique code that is forwarded to ID provider 130 when information is requested. This unique code may be used by ID provider 130 to retrieve the requested information for the particular user. As described above, communication logic 330 may also forward information identifying ID requestor 120 (e.g., alcohol store location/identity via GPS coordinates, a barcode, a store location code entered manually, etc.) to ID provider 130. Communication logic 330 may forward the information identifying ID requestor 120 with the user-related request information.

ID provider 130 may receive the information (act 550). Verification logic 420 may then determine the identity of the party requesting the information, as well as the identity of ID requestor 120. For example, verification logic 420 may identify the user requesting information based on the unique code that identifies the user that was provided with the message from ID presenter 110. Examples of unique codes that may be used to identify the user may include a social security number of the user, an international mobile equipment identity (IMEI) code associated with ID presenter 110, etc. In addition, verification logic 420 may identify ID requestor 120 by, for example, decoding a barcode that identifies ID requestor 120 that was included in the message. Alternatively, verification logic 420 may identify ID requestor 120 using GPS coordinates included in the message and performing a lookup in a database that correlates location information to one of a number of ID requestors 120. In still other instances, verification logic 420 may analyze the store code information manually entered into ID presenter 110 (that was included in the request) to identify ID requestor 120, or identify ID requestor 120 by other mechanisms.

After verifying the user and ID requestor 120, retrieve logic 430 may retrieve information associated with the requested information (act 550). For example, continuing with the example above in which ID provider 130 is a state's DMV, retrieve logic 430 may access database 440 to obtain the driver's license associated with ID presenter 110. That is, database 440 may be a database of driver's licenses issued by the DMV and retrieve logic 430 may look up and retrieve the driver's license corresponding to the user associated with ID presenter 110.

Verification logic 420 may also generate transaction information associated with the request that may be used by ID requestor 120 to verify the authenticity of information provided to ID presenter 110. As an example, verification logic 420 may generate a timestamp associated with the time at which the request for driver's license information was received or fulfilled. Verification logic 420 may also generate a transaction identifier that includes information identifying ID requestor 120. The timestamp and information identifying ID requestor 120 may be encoded in a barcode or encrypted in some manner. In some implementations, the transaction information may include a checksum value used to authenticate the information. In each case, ID requestor 120 may use the transaction information to authenticate the information provided by ID provider 130, as described below.

ID provider 130 may forward the retrieved driver's license, along with the transaction/authentication information to ID presenter 110 (act 550). For example, communication logic 410 may forward the driver's license image information and text information included on the driver's license (e.g., date of birth, address, etc.), along with additional transaction information to ID presenter 110.

ID presenter 110 may receive the information from ID provider 130 (act 560). ID presenter 110 may then output the received information. For example, display logic 340 may display the driver's license on output device 250 (e.g., an LCD display screen). The user may then show the driver's license displayed on ID presenter 110 for verification by a party associated with ID requestor 120 (act 570).

For example, a clerk at ID requestor 120 (i.e., a liquor store clerk in this example) may verify the ID by looking at the ID displayed on the user's cell phone (i.e., ID presenter 110) to determine if the picture matches the user. The clerk may also scan the bar code included with the transaction information forwarded by ID provider 130 to determine whether the bar code information matches the store information. The clerk may further check the timestamp information to ensure that the time stamp indicates that the information received from the DMV is current and not associated with a previous request by ID presenter 110. In instances where a checksum is included with the transaction information, a processor at ID requestor 120 may verify the checksum.

In other implementations, the clerk at ID requestor 120 may contact (e.g., call via telephone, contact via the Internet, etc.) ID provider 130. In one implementation, an automated system at ID provider 130 may provide the clerk with the transaction information encoded in the barcode. ID provider 130 may then verify that the transaction information provided to ID presenter 110 was actually processed by ID provider 130 and was not associated with a shell program or some other software operating on ID presenter 110 attempting to deceive the clerk at the liquor store. In some implementations, the system at ID provider 130 may audibly read out the information provided including a verbal description of the image/picture presented to ID presenter 110. In other instances, a human operator at ID provider 130 may provide ID requestor 120 with information regarding the transaction. In this manner, ID requestor 120 may ensure that the information displayed on ID presenter 110 is authentic.

In the scenario described above, a user associated with ID presenter 110 provides a request for age verification information, along with information associated with ID requestor 120, to ID provider 130. ID provider 130, in turn, provides the requested information to ID presenter 110. ID requestor 120 may then verify the ID of the user. For example, as described above, a barcode or other authentication information provided by ID provider 130 may be verified by ID requestor 120 to ensure that the information is authentic.

In addition, to further prevent non-authentic information or to prevent a user associated with ID presenter 110 from manipulating ID verification program 300, ID presenter 110 may include logic (e.g., a subscriber identity module (SIM) chip or card) to verify the integrity of memory space and to prevent shell programs from running and intercepting data provided by ID provider 130. For example, a key may be stored in protected memory or storage space (e.g., on a SIM card, a micro secure digital (SD) card, or in another memory/storage space) on ID presenter 110 to which only ID verification program 300 has access. In this manner, only ID verification program 300 may access the key to allow ID verification program 300 to read, display and/or decode received identification information and/or authentication information. This may prevent the identity data from being stolen or used by other applications for non-intended purposes. In situations in which ID presenter 110 includes no protected memory space, ID verification program 300 may use an embedded secret value or key to encrypt sensitive data (e.g., the person's identity key) prior to placing it in memory/storage. ID verification program 300 may then decrypt the sensitive data and/or received identification information using the secret value or key as needed.

In other implementations, the barcode and timestamp credentials may provide further security against tampering/hacking of ID verification program 300. Still further, mutual records may be maintained at ID provider 130 and ID requestor 120 to verify authenticity of data.

In other implementations, ID provider 130 may provide the ID information and authentication information to ID requestor 120. For example, ID requestor 120 may include a point of sale (POS) terminal that includes communication functionality that allows ID requestor 120 to communicate via network 140. In this case, ID provider 130 may forward the information requested by ID presenter 110 to ID requestor 120. In some instances, the information may be forwarded by ID provider 130 to both ID presenter 110 and ID requestor 120. In still other instances, the information may be forwarded by ID provider 130 to only ID requestor 120. In each case, ID requestor 120 may output the received information to a screen associated with the POS terminal. ID requestor 120 may then verify the picture and age information, along with the timestamp and other transactional information.

In still other implementations, the POS terminal at ID requestor 120 may include a unique code that changes periodically, such as daily or one time. In this scenario, ID provider 130 may be aware of the code of the day or moment in time and embed that code with the other authentication information. ID requestor 120 may then verify the code that is received from ID provider 130. This may provide another level of security with respect to validating the user's ID.

In another implementation, ID presenter 110 may have a digital certificate stored on a SIM chip or on an external memory that may be inserted into ID presenter 110. The digital certificate may be used to encrypt data stored locally on ID presenter 110 or decrypt data read locally from ID presenter 110. The certificate may also be used as part of the handshake between ID presenter 110 and ID provider 130. This also may provide an additional level of security with respect to validating the user's ID.

In still other implementations, the interactions between ID presenter 110 and ID requestor 120 may include a number of communications that further aid in securing the transaction. For example, in some implementations, ID presenter 110 and ID requestor 120 may communication via Internet protocol (IP), radio frequency identification (RFID), WiFi bridging, etc. In such implementations, ID presenter 110, ID requestor 120 and ID provider 130 may initiate a three-party certification session that provides for authenticating the parties, such as authentication using public key/private keys, and exchange identifiers for each party embedded in the authorization and record-keeping. In this manner, ID requestor 120 can ensure that ID presenter 110 has not forged any of the information provided to ID provider 130 or any of the information received from ID provider 130.

In some implementations, ID provider 130 may charge a transaction fee associated with performing services to verify ID presenter 110. For example, ID provider 130 may charge a small fee (e.g., a microtransaction or micropayment fee) to ID requestor 120 and/or ID presenter 110 for providing electronic identification information. In some implementations, the fee may be based on the type and/or amount of information provided to ID presenter 110 and/or ID requestor 120. For example, for ID verifications or transactions involving high security requirements, ID provider 130 may charge a higher fee than for transactions involving lower security requirements. In addition, in some implementations, ID provider 130 may automatically receive payment from ID requestor 120 and/or ID presenter 110 via, for example, an electronic payment based on previously agreed upon fee structures for providing identification information.

As described above, ID verification program 300 may be used to verify a party's age via information received from information provider 130. In other implementations, ID verification program 300 may be used with respect to any transaction in which identity must be verified. For example, ID verification program 300 may be used to present ID for voting. In this scenario, ID requestor 120 may be a polling place and ID provider 130 may be a state or municipality's board of elections that stores voter registration information. ID presenter 110 may request his/her voting registration information and interact with ID provider 130 and ID requestor 120 in a similar manner as described above with respect to FIG. 5.

As another example, ID verification program 300 may be used when purchasing a firearm or other item that is controlled by some agency. In this case, ID requestor 120 may be a retail establishment that sells firearms and ID provider 130 may be a state agency responsible for administering the sale of firearms. In this scenario, ID provider 130 may manage digital IDs associated with parties who have registered to purchase firearms. In addition, ID provider 130 may check one or more other databases that might invalidate such a purchase. For example, retrieve logic 430 of ID provider 130 may access database 440 and/or another database located externally with respect to ID provider 130 (e.g., a database administered by law enforcement) to identify parties with previous criminal records in any state, or the like. If retrieve logic 430 determines that the user has a criminal history, ID provider 130 may not provide the ID, or may provide the ID with transaction information indicating that the firearm purchase should be denied.

Figure 6:
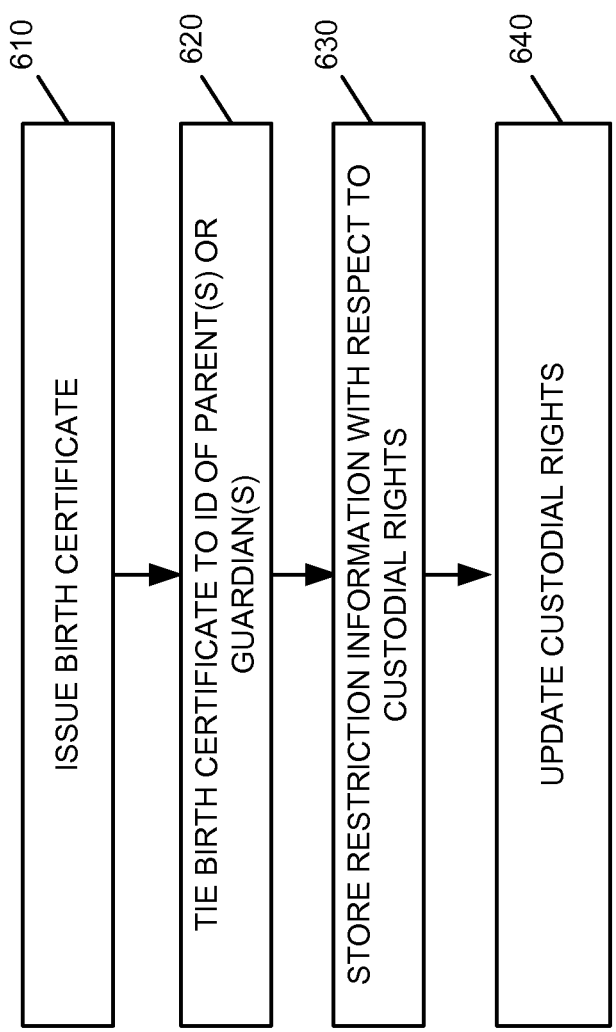
FIG. 6 is a flow diagram illustrating exemplary processing by various components of FIG. 1 in accordance with another exemplary implementation.

As another example, ID verification program 300 may be used in conjunction with verifying child custodial rights of parents or guardians. FIG. 6 illustrates exemplary processing associated with verifying custodial rights. In this scenario, assume that a parent associated with ID presenter 110 would like to pick up his/her child at a day care facility or at a school. Further assume that ID requestor 120 may be the day care facility and that ID provider 130 may be a state or national Department of Health and Human Services (referring to herein as HHS). Processing may begin with a government department, such as HHS, issuing a birth certificate or some other form of ID after the birth of a child (act 610). ID provider 130 (i.e., HHS in this example) may store this information in, for example, database 440. ID provider 130 may also tie the birth certificate of the child to ID of one or more of the parents or guardians of the child (act 620). ID provider 130 may also store restrictions with respect to the custodial rights of the parent/guardian (act 630).

For example, FIG. 7 illustrates a configuration of database 440 in accordance with an exemplary implementation. Referring to FIG. 7, database 440 may include ID presenter field 702, children field 704 and restrictions field 706. It should be understood that database 440 may include other fields, such as a relationship field indicating the relationship between the party in ID presenter field 702 and the party(ies) in children field 704, such as mother, father, nephew, legal guardian, etc.

Entries 440-1 through 440-N may include a number of entries associated with different ID presenters. As an example, entry 440-1 includes the name Bill Smith in ID presenter field 702, the name Jane Smith in children field 704 and the word none in restrictions field 706. In this case, database 440 indicates that Bill Smith has custodial rights for Jane Smith and that there are no restrictions regarding his custodial rights. Similarly, entry 440-2 indicates that Mary Smith also has custodial rights for Jane Smith with no restrictions.

Entry 440-3 indicates that Roger Jones has custodial rights for Carl Jones and Beth Jones on Saturday and Sunday. Entry 440-4 indicates that Susan Jones has custodial rights for Carl Jones and Beth Jones on Monday through Friday. Entry 440-N indicates that Joe Rodgers has custodial rights for Mike Rogers with no restrictions.

As situations change, ID provider 130 may update restrictions field 706 (act 640). For example, if Roger Jones is granted custody of Carl Jones and Beth Jones on Wednesdays (in addition to Saturday and Sunday) by some court or governmental agency, restrictions field 706 in entry 440-3 may be updated to reflect the change.

In the manner described above, ID provider 130 is essentially generating and storing an electronic "keyring" that may be used to allow the day care facility or any other facility (e.g., a border crossing, airport, etc.) to quickly determine a parent's custodial rights. For example, assume that Mary Smith wishes to pick up her child, Jane Smith, from the day care facility on a Tuesday. In this example, Mary may launch ID verification program 300 from ID presenter 110 (e.g., her cell phone). ID presenter 110 may obtain information from Mary and ID requestor 120 in a similar manner to that described above with respect to FIG. 5. ID presenter 110 may also establish a connection with ID provider 130. ID provider 130 may then determine whether Mary Smith has custodial rights and is authorized to pick up Jane Smith on Tuesdays.

Continuing with the example above, ID provider 130 may forward information to ID presenter 110 and/or ID requestor 120 providing information indicating the days on which Mary is authorized to pick up Jane. In other implementations, ID provider 130 may merely provide information indicating that Mary is authorized to pick up Jane on that particular day. In still other implementations, ID provider 130 may include biometric or other information associated with Jane Smith and/or Mary Smith that may be verified by ID requestor 120.

In this manner, when picking up children from day care, for example, the credentials can be accessed and verified. As also described, when a parent's custodial rights change (e.g., a parent loses custody or custody is modified), a court may notify ID provider 130. ID provider 130 may then change guardianship rights immediately and secondary care will be able to immediately have access to the changed rights. In this manner, electronic keyrings may be used to tie the identity of one party to the identity of one or more other parties.

In some implementations, electronic keyrings may be used to verify a party's identity to allow the party to obtain electronic or physical custody of other things. For example, similar to the discussion above with respect to FIG. 6, an electronic keyring may be used to allow ID presenter 110 to obtain physical custody of a briefcase, a file folder containing documents, a laptop computer, an item that ID presenter 110 has purchased, or some other physical device. In addition, an electronic keyring may be used to allow ID presenter 110 to obtain electronic custody of or access to electronic files or other data. For example, ID provider 130 may have a database of information identifying parties to whom access to electronic files stored at ID provider 130, ID requestor 120 or elsewhere may be granted. ID presenter 110 may be granted access to the electronic files or other data based on ID presenter's 110 access rights (stored at ID provider 130) with respect to the electronic files/data. In each case, ID provider 130 may store information indicating access rights associated with ID presenter 110. ID provider 130 may forward information to ID presenter 110 and/or ID requestor 120 indicating whether ID presenter 110 is authorized to obtain physical custody or electronic custody/electronic access to the particular item/data.

Figure 8:
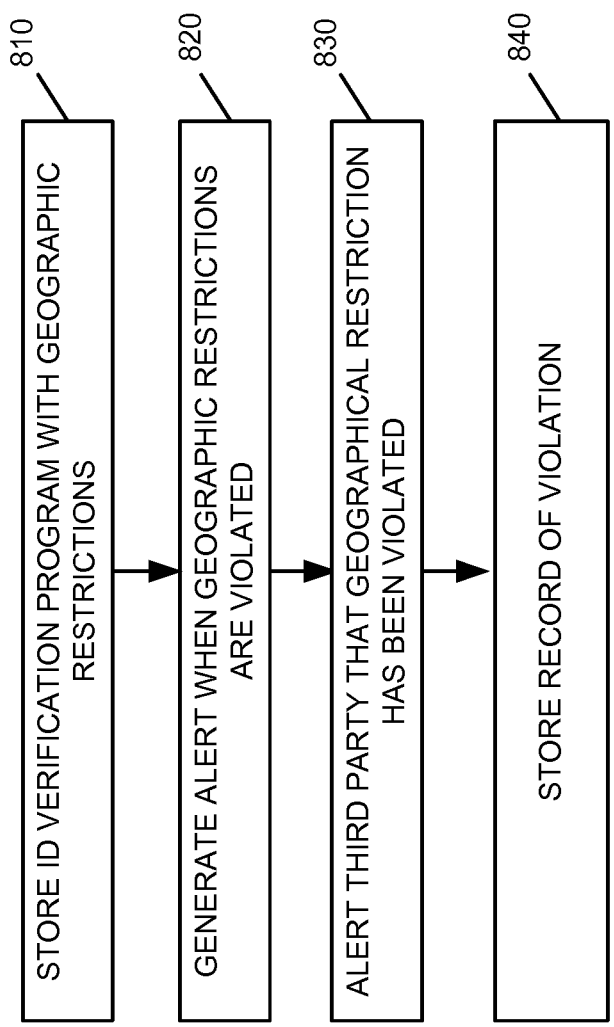
FIG. 8 is a flow diagram illustrating exemplary processing by various components of FIG. 1 in accordance with still another exemplary implementation.

As another example, ID verification program 300 may be used in conjunction with geographical information to aid in enforcing location related restrictions on parties. FIG. 8 illustrates exemplary processing associated with enforcing geographical or proximity restrictions on parties. In this scenario, assume that a user associated with ID presenter 110 has been convicted of a crime that prohibits him/her from coming within a certain distance (e.g., ½ of a mile) of a school. Further assume that ID provider 130 represents a law enforcement agency associated with enforcing the restriction. Processing may begin with a government department, such as the police department, storing ID verification program 300 with geographic restriction information on ID presenter 110 associated with the party convicted of a crime (act 810). ID verification program 300 may include pre-stored locations of each school, along with a defined border/perimeter of, for example, ½ of a mile from the school. Alternatively, the location of school grounds/perimeter may be "painted" via a WiFi perimeter, RFID or other electronic indicators. ID verification program 300 may also include security software that prevents the user of ID presenter 110 from tampering with ID verification program 300. For example, if ID verification program 300 is tampered with, ID verification program 300 may immediately signal ID provider 130.

As described above, ID presenter 110 may include GPS device 280. If the user of ID presenter 110 comes within ½ of a mile of a school, communication logic 330 of ID presenter 110 may automatically generate an audible and or visual alert on ID presenter 110 (act 820). This may alert the user that he/she is violating a condition of his/her parole.

If the user does not immediately heed the warning and move to a location outside the defined perimeter of the school, ID presenter 110 may send a message to ID provider 130 (act 830). The message may include information identifying the user, as well as location information indicating the user's location. Law enforcement may then be dispatched to the appropriate location. ID provider 130 and/or ID presenter 110 may also log the violation (act 840).

In this manner, ID verification program 300 may be used on an individual's mobile device (e.g., cell phone) with authenticated IDs to produce an alert when the user of ID presenter 110 is within the restricted distance. If the warning is not heeded, the information could be logged and/or shared with local law enforcement. In some instances, an alert, such as a broadcast alert, may be issued when a party, such as a drug offender or sex offender, comes within the prohibited area. The location or proximity restrictions may be provided by WiFi, RFID or other registered and broadcasted mechanisms.

The implementations described above include scenarios in which a user's digital or virtual ID is managed by ID provider 130. The implementations described above also include scenarios in which a user's digital ID is tied to another party's digital ID. Still further, implementations described above include scenarios in which the user's digital ID is used in conjunction with geographic or proximity associations to enforce various geographic restrictions. It should be understood, however, that ID verification program 300 may be used in many other scenarios.

For example, ID verification program 300 may be used to verify professional accreditation of a party. In this scenario, ID verification program 300 may be used for any profession that requires certification via a license or some other mechanism to allow the user to perform services. As an example, ID presenter 110 may represent a lawyer who has passed the Bar exam in a particular state, an accountant who has passed the CPA exam, a teacher who has obtained state teaching certification, etc. In this case, ID provider 130 may be a state agency (e.g., Bar organization, CPA accreditation organization, teacher licensing department) and ID requestor 120 may represent any party who wants to verify the user's credentials. Similarly, this functionality could be extended to verifying that a contractor is licensed and insured. That is, a ID requestor 120 may be a homeowner that wishes to verify that the contractor (i.e., ID presenter 110 in this case) is licensed and insured.

In other implementations, ID verification program 300 may include an extension to verifying professional accreditation in certain emergency type scenarios. For example, if a doctor or reporter shows up at the scene of an accident, ID verification program 300 may be used to show proof of medical or press credentials at the scene of the emergency. That is, medical or press credentials could be verified to vet the individual, and allow an ID requestor 120 (e.g., emergency response personnel) to grant the user (e.g., the doctor) access to the accident scene. Further, medical credentials could be validated and vetted, and medical capabilities could be determined to best match the individual's medical capabilities to roles to which they are best suited. That is, ID provider 130 may store information regarding the user's particular credentials (e.g., the doctor is a general surgeon) that is provided to ID presenter 110 and/or ID requestor 120. ID requestor 120 may then verify the user's credentials and assign the user to a particular area of the accident scene.

Continuing with the example of an emergency situation, ID verification program 300 may be used to provide detailed and accurate medical information for victims at the scene of an emergency. For example, ID requestor 120 may be a first responder wishing to obtain information regarding the victim's (i.e., ID presenter 110) medical history. In this case, ID provider 130 may represent an entity storing and managing ID presenter's 110 medical history. ID requestor 120 may contact ID provider 130 via ID presenter 110 (e.g., the victim's cell phone). In such a scenario, ID provider 130 may provide to ID presenter 110 an accurate and complete medical record. In other implementations, ID requestor 120 may provide a unique code to ID provider 130 to allow ID requestor 120 to receive and display the victim's medical history, but not store the victim's or patient's medical records.

In cases in which the victim/patient is conscious, he/she could expressly present all or some sub-set of information without violating certain governmental rules, such as rules associated with the Health Insurance Portability and Accountability Act (HIPAA), or requiring the medical provider to store records and comply with HIPAA regulations relating to the storage of those records. In cases in which the victim is unconscious, ID presenter 110, ID requestor 120 and ID provider 130 may have a pre-determined arrangement as to the information that may be presented to third parties, such as ID requestor 120.

ID verification program 300 may also be used for presenting medical coverage information to a healthcare provider. In this case, ID requestor 120 may be the healthcare provider and ID provider 130 may be the entity, such as a medical insurance company, with whom ID presenter 110 has health care coverage. In such an implementation, ID requestor 120 may receive medical coverage information from ID provider 130. The medical coverage information may be coupled with the user's identity to reduce medical fraud and ensure that the user/patient's (e.g., ID presenter 110) coverage is active.

The healthcare provider (e.g., ID requestor 120) may then receive information regarding the extent of coverage to avoid over/under billing. When coupled with the previous use case regarding providing medical records via ID verification program 300, medical records may be viewed and validated by the healthcare provider (i.e., ID requestor 120). At the same time that these records are updated, Medicare codes could be generated for the purpose of billing the insurance company (i.e., ID provider 130).

In some implementations, the insurance company could be provided a specific key that unlocks the appropriate Medicare codes necessary for billing the user and also be provided validation information indicating that supporting medical information (which may not be provided) is on file. In this case, ID requestor 120 (e.g., the healthcare provider) may not need to store any medical records regarding the patient and would not require continued access to the patient information. Therefore, in this scenario, the user/patient would remain in control of his/her medical records and could easily provide access to health care providers while he or she is obtaining care.

In still another implementation, ID verification program 300 may be used in conjunction with electronic prescriptions. In this example, ID provider 130 may be a medical provider and ID requestor 120 may represent a pharmacy. In this case, a patient may present his/her prescription drug coverage information to ID provider 130 (i.e., the medical provider) via ID verification program 300 stored on ID presenter 110. In this scenario, the medical provider may discuss the out of pocket costs of various drugs as well as their effectiveness and side effects. This may help prevent patients from being prescribed a high cost drug when an equally good low cost variant would be effective. This may also enable patients to choose a less effective lower cost drug when a more effective drug is not affordable.

In each case, ID provider 130 (e.g., the health care provider) may generate a digital prescription and chain it to the patient's digital identity in a manner similar to that described above with respect to FIG. 6 regarding chaining a child's identity to a guardian's identity. The patient (i.e., ID presenter 110) could then walk into any pharmacy (e.g., an ID requestor 120) and present their digital credentials that may include his/her ID, photo, insurance information, the digital prescription and/or his/her store club card. ID requestor 120 may then verify and process the prescription.

In addition, the pharmacist at ID requestor 120 could also verify all current medications for drug interactions. In some implementations, if the patient provides his/her permission, the pharmacist could check historical drug information (without storing or incurring any HIPAA requirements with regards to storing patient information), such as when a particular prescription was filled and if it has already expired, or if the drug associated with the prescription was taken in the past and at what dosage and frequency. Once the prescription is picked up, the pharmacy (e.g., ID requestor 120) may mark the prescription as filled, thereby invalidating the digital prescription (preventing replay attacks), or reducing the refill count by one. In this manner, ID provider 130 may allow an ID requestor 120 to fill a prescription and can also enable the patient to fill future refills at any pharmacy without having to physically transfer a prescription.

In still another implementation, ID verification program 300 may be used in conjunction with permits that may be attached to a digital ID (similar to prescriptions or child custody). For example, permits such as hunting permits, fishing permits, gun carrying permits may be tied to or attached to an ID presenter's 110 digital ID. This may allow the ID presenter 110 to show a digital identity and a corresponding permit to validate that a particular person has the right to hunt, fish, or conceal and carry a hand gun. When a permit expires or is revoked, ID provider 130 (e.g., the appropriate governmental agency) may simply modify the status of the permit to indicate that it has been expired/revoked.

Another use case regarding ID verification program 300 may be to verify identity and/or citizenship for employment and/or other purposes. In this case, an ID requestor 120 (e.g., a company wishing to hire a person) could receive information from ID provider 130 to ensure that that ID presenter 110 (e.g., a potential new hire) is a citizen and not an illegal alien, does not have a criminal record, etc.

Still another use case regarding ID verification program 300 may be to allow a party to directly communicate with another ID verification program and ID provider 130 to verify a party's identify. For example, assume that one person is meeting another person on a blind date facilitated by a dating service. In this scenario, one of the user's may represent ID presenter 110 and the other party may represent ID requestor 120. ID provider 130, in this case, may transmit information to the ID requestor 120 regarding the user's identity For example, ID provider 130 may download a photo of ID presenter 110 so that the ID requestor 120 can verify the user's identity.

In some implementations, ID verification program 300 may include software for remotely purging contents of ID verification program. For example, assume that the user has lost his/her mobile device (e.g., ID presenter 110). In this case, the user may contact ID provider 130 and any previously downloaded credential information may be remotely purged. A new ID presenter 110 may then be loaded with the user being authenticated at ID provider's 130 location or a service provider's location, and credentials from each ID provider may also be downloaded to ID presenter 110.

Implementations described herein provide electronic identification, as well as verification of the electronic identification information. As described above, a mobile device or other device may be used to request ID information that may be verified or authenticated by another party. This may allow parties to reduce fraud with respect to verifying identities, as well as simplify an ID verification process.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to an ID provider 130 issuing and managing IDs on behalf of users. In other implementations, the entity that issues IDs (e.g., DMV, HHS, etc.) may contract out the management of the IDs to a service provider who manages the IDs on behalf of the entity that issues the IDs.

Further, while series of acts have been described with respect to FIGS. 5, 6 and 8, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A non-transitory computer-readable medium having stored thereon sequences of instructions which, when executed by at least one processor, cause the at least one processor to:
    receive, from a user of a mobile device, information identifying a type of identification information that the user would like to receive;
    obtain first coded information identifying an entity at which the user's identification information is to be verified;
    forward, by the mobile device, a request for identification information associated with the user of the mobile device, wherein the request identifies the type of identification information that the user would like to receive and includes the first coded information;
    receive, from an identification provider, the identification information and transaction information, wherein the transaction information comprises a timestamp indicating when the request for identification information was received by the identification provider or was fulfilled by the identification provider and second coded information to be compared with the first coded information by the entity at which the user's identification is to be verified; and
    display, by the mobile device, the identification information, the second coded information and the timestamp for verification by the entity, wherein the verification includes comparing the first coded information to the second coded information.

2. The non-transitory computer-readable medium of claim 1, wherein the second coded information identifies the entity at which the user's identification information is to be verified.

3. The non-transitory computer-readable medium of claim 1, wherein the first coded information comprises barcode information and when forwarding a request for identification information, the instructions cause the at least one processor to:
    forward, with the request, the barcode information identifying the entity at which the user's identification information will be verified.

4. The non-transitory computer-readable medium of claim 1, wherein the received identification information includes an image of the user, and the second coded information is to be used for verifying authenticity of the identification information.

5. The non-transitory computer-readable medium of claim 4, wherein the image comprises an image associated with a photo identification of the user stored by the identification provider.

6. The non-transitory computer-readable medium of claim 4, wherein the instructions further cause the at least one processor to receive, from the identification provider, information identifying another person for whom the user has custodial rights.

7. The non-transitory computer-readable medium of claim 4, wherein the instructions further cause the at least one processor to receive information identifying at least one of a drug prescription or job credential associated with the user.

8. The non-transitory computer-readable medium of claim 1, further including instructions for causing the at least one processor to:
    link at least one of another party's identification information to the user's identification information; and
    provide the linked information to the mobile device or to another device.

9. The non-transitory computer-readable medium of claim 1, further including instructions for causing the at least one processor to:
    identify proximity information associated with the mobile device; and
    provide an alert or an alarm to another party based on the proximity information.

10. The non-transitory computer-readable medium of claim 1, further including instructions for causing the at least one processor to:
    instruct the identification provider to forward the identification information to the entity that will verify the identification information.

11. A computer-implemented method, comprising:
    storing identification information for a plurality of users;
    receiving, from a first mobile device, a request for identification information associated with a user of the first mobile device, wherein the request identifies a type of identification information that the user would like to receive and identifies an entity at which the user's identification information is to be verified;
    retrieving stored identification information associated with the user of the first mobile device;
    generating authentication information, the authentication information including time information identifying when the request was received or when the request was fulfilled and first information identifying the entity at which the user's identification information is to be verified;
    accessing a database to obtain additional information associated with the request, wherein the additional information comprises at least one of a restriction or limitation associated with the identification information;

forwarding the identification information and the additional information to at least one of the first mobile device or the entity at which the identification information will be verified; and forwarding the authentication information to at least one of the first mobile device or the entity at which the identity information will be verified, wherein the authentication information is verified by comparing the first information to second information identifying the entity.

12. The computer-implemented method of claim 11, wherein the authentication information includes location information associated with a location of the entity.

13. The computer-implemented method of claim 12, wherein the forwarding authentication information comprises:

forwarding the authentication information encoded within a barcode or forwarding the authentication information in an encrypted form.

14. The computer-implemented method of claim 11, wherein the retrieving stored identification information comprises retrieving a driver's license of the user or a photograph of the user.

15. The computer-implemented method of claim 11, further comprising:

receiving a communication from the entity wishing to verify the forwarded identification information; and automatically providing information to the entity in response to the communication.

16. The computer-implemented method of claim 11, wherein the retrieving stored identification information comprises:

accessing a second database including information associated with the user of the first mobile device and information linked to the user of the first mobile device.

17. The computer-implemented method of claim 16, wherein the linked information comprises at least one of identification information of another person for whom the user has custodial rights, a drug prescription for the user, or job credential information associated with the user, and wherein the computer-implemented method further comprises:

forwarding the linked information to at least one of the first mobile device or the entity at which the identity information will be verified.

18. A computer-implemented method, comprising:

receiving, at a first entity and from a user of a mobile device, information identifying a type of identification information to be used by the first entity to verify an identity of the user;

obtaining, by the first entity, first information identifying the first entity;

forwarding, by the first entity, a request for the type of identification information, wherein the request includes the first information;

receiving, by the first entity and from an identification provider, identification information associated with the user of the mobile device, wherein the identification information is provided in response to the request;

receiving, by the first entity and from the identification provider, encoded authentication information associated with the identification information, wherein the encoded authentication information includes second information identifying the first entity and time information corresponding to one of a time when the request was received or a time when the request was fulfilled;

displaying the identification information;

decoding, by the first entity, the encoded authentication information; and verifying, by the first entity, the authentication information by comparing the first information to the second information.

19. The computer-implemented method of claim 18, wherein the encoded authentication information comprises information encoded via a barcode, and wherein the decoding comprises:

decoding the barcode.

20. The computer-implemented method of claim 18, further comprising:

establishing, by the first entity, communications with the identification provider; and verifying at least some of the authentication information.

21. The computer-implemented method of claim 18, further comprising:

providing, by the first entity, a payment to the identification provider based on the received identification information.

22. The computer-implemented method of claim 18, further comprising:

storing, by the first entity, a key or value in a protected storage area of the first entity; and limiting access to the key or value to an identification program stored in the first entity, and wherein at least one of the displaying and decoding comprises:

accessing, by the identification program, the key or value, and using the key or value to display the identification information or decode the encoded authentication information.

* * * * *